US007772984B2

(12) United States Patent
Huang

(10) Patent No.: US 7,772,984 B2
(45) Date of Patent: Aug. 10, 2010

(54) REMOTE CONTROL SECURITY SUPERVISORY CONTROL APPARATUS

(75) Inventor: Cheng-Hung Huang, Taoyuan County (TW)

(73) Assignee: Everspring Industry Co., Ltd., Taoyuan County (TW)

( * ) Notice: Subject to any disclaimer, the term of this patent is extended or adjusted under 35 U.S.C. 154(b) by 453 days.

(21) Appl. No.: 11/976,698

(22) Filed: Oct. 26, 2007

(65) Prior Publication Data

US 2009/0109017 A1 Apr. 30, 2009

(51) Int. Cl.
*G08B 21/00* (2006.01)
*G08B 1/08* (2006.01)
*H04B 1/06* (2006.01)

(52) U.S. Cl. ............................ 340/636.15; 340/539.16; 455/352

(58) Field of Classification Search ................................ 340/539.16–539.19, 541–567; 455/352, 455/343.1–343.6, 344
See application file for complete search history.

(56) References Cited

U.S. PATENT DOCUMENTS 5,689,235 A * 11/1997 Sugimoto et al. ........... 340/541
6,100,814 A * 8/2000 Doyle .................... 340/825.69
7,113,099 B2 * 9/2006 Tyroler et al. ............ 340/573.4

* cited by examiner

*Primary Examiner*—Jennifer Mehmood
(74) *Attorney, Agent, or Firm*—Muncy, Geissler, Olds & Lowe, PLLC

(57) ABSTRACT

A remote control security supervisory control apparatus includes a remote control device capable of performing remote control, at least one sensor to detect risky conditions in a surveillance scope and a system host to execute a security supervisory control system procedure. The remote control device can perform system alteration on the sensor at a remote site. The remote control device first outputs a wake-up signal to make the individual sensor to enter a setting mode from a sleeping mode; then the remote control device outputs a command signal to the system host through the sensor. The system host feedbacks a confirmation signal to the sensor to finish setting alteration of the security system procedure.

11 Claims, 3 Drawing Sheets

REMOTE CONTROL SECURITY SUPERVISORY CONTROL APPARATUS

FIELD OF THE INVENTION

The present invention relates to a security supervisory control system control apparatus and particularly to a control apparatus for a security supervisory control system to control remote sensors.

BACKGROUND OF THE INVENTION

A conventional security system for residence discloses in U.S. Pat. Nos. 7,113,099 and 5,689,235 which generally consists of a system host, various types of sensors, monitor video cameras and various types of alarms. These devices are communicated through radio frequency signals. In the past, when the system host is in an alert condition, namely people are absent from the house, commands have to be entered in advance on the keyboard of the system host to make all the sensors and alarms under the control of the system host to enter an alert condition to guard against intruders or detect risky environmental conditions. When the people of the house return or are resting indoors at night, the alarms and sensors cannot be all set ON, otherwise the sensors in the house could be mistakenly triggered to generate a faulty alarm. Hence the system host should be able to selectively actuate the sensors. While such a technique resolves the problem of triggering faulty alarm, it also creates other problems to users. Because the sensors have to be selectively actuated, all the alarms and sensors have be coded and numbered. And the individual numbers of the alarms and sensors have to be entered on the keyboard of the system host according to requirements so that the computer of the system host can determine which alarms and sensors to be set ON and OFF. In a smaller space in which the number of the alarms or sensors is smaller, a user can set the required sensors based on his/her memory. In the event that the scope of security alarm is greater, and the number of sensors increases. To set the required sensors not only has to rely on user's memory but also has to enter the number of the individual sensors into the system host. It is tedious and takes a lot of time. At present setting a complete security system still has to rely on the technicians of the security service provider. The service fee is charged according to the service content. Altering system procedures incurs additional expense to house owners. Alteration of the security system also cannot be done instantly according to requirement.

SUMMARY OF THE INVENTION

The primary object of the present invention is to simplify setting of a security system and reduce setting time and cost. To achieve the foregoing object the invention provides a remote control security supervisory control apparatus that includes a remote control device capable of performing remote control, at least a sensor to detect risky conditions in a surveillance scope and a system host to execute a security supervisory control system procedure. The sensor detects the risky conditions of an environment and informs the system host to process the security supervisory control system procedure. The remote control device can output a wake-up signal to the sensor so that the sensor enters a setting mode from a sleeping mode to make system alteration. The sensor in the setting mode can receive a first command signal sent from the remote control device and transform to a second command signal to be sent to the system host to execute alteration of the security supervisory control system procedure. Finally the system host feedbacks a confirmation signal to the sensor, and a display device located on the sensor posts information to notify users that system setting has been finished. By means of the remote control security supervisory control apparatus of the invention the users can easily set ON and OFF of the individual sensors through the remote control device without setting on the system host for the detection scope as the conventional security system does. Hence setting of the security supervisory control system is greatly simplified. It also requires only a lower technical skill and less time to do the setting.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
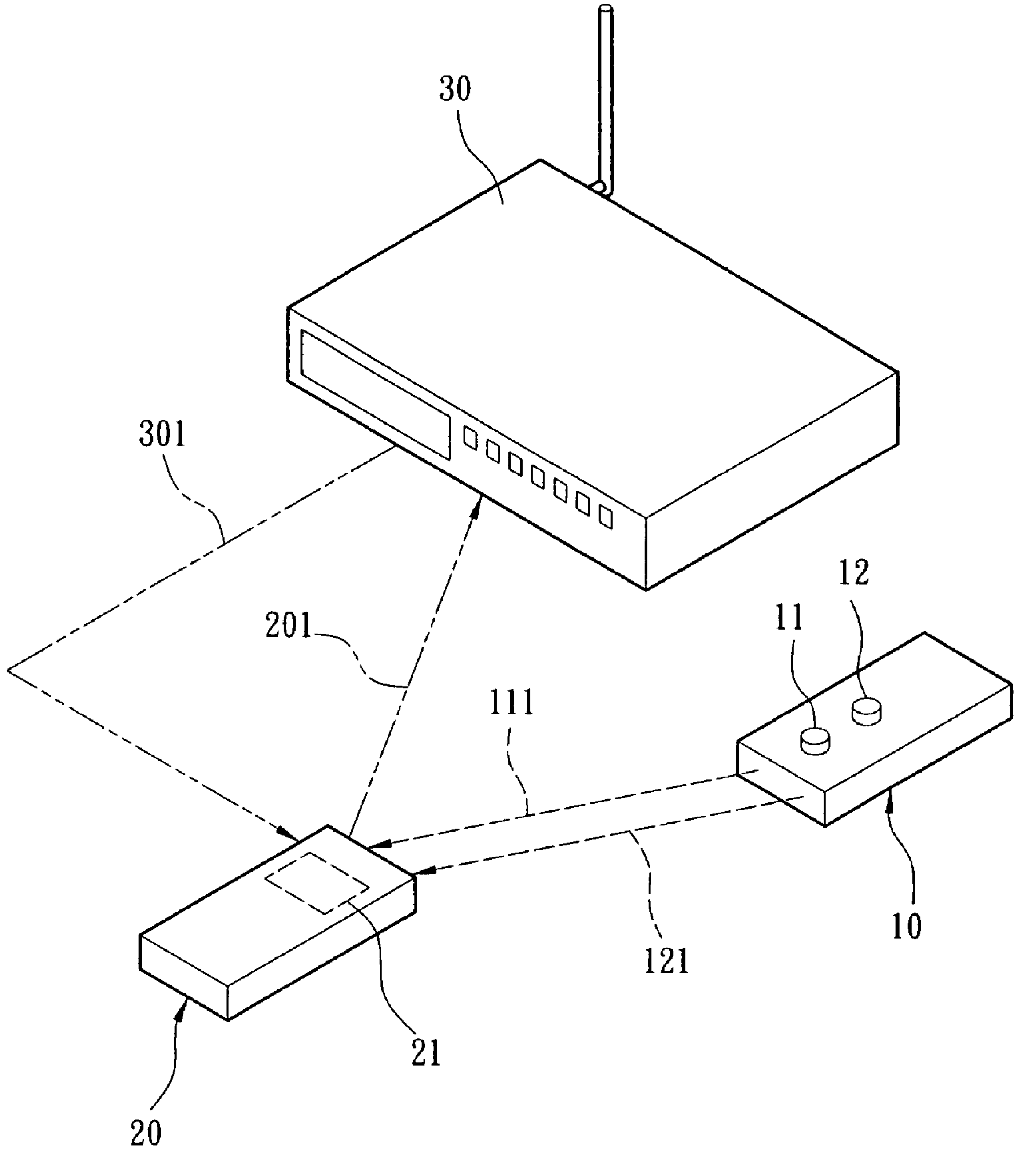
FIG. 1 is a schematic view of signal transmission of an embodiment of the invention.

Please refer to FIG. 1 for a schematic view of signal transmission of an embodiment of the invention. a remote control security supervisory control apparatus according to the invention mainly includes a remote control device 10 capable of performing remote control, at least one sensor 20 to detect risky conditions in a surveillance scope, and a system host 30 to execute a security supervisory control system procedure. The sensor 20 detects the risky conditions and informs the system host 30 to execute the security supervisory control system procedure. Transmission of signals in the security supervisory control system is carried out through radio frequency.

The remote control device 10 is in a sleeping mode in regular conditions. It has a start key 11 to actuate the remote control device 10 to enter a designated mode from the sleeping mode. In that condition the remote control device 10 reduces the power of its output signal to prevent the neighboring sensor 20 from receiving the signal and incurring interference. In the designated mode the remote control device 10 sends a wake-up signal 111 to the sensor 20. The remote control device 10 further has at least one designated function key 12 to output a first command signal 121 to the sensor 20. The function key 12 may also be a compound key to avoid being hit mistakenly and sending the first command signal 121. The number of keys may also be reduced to shrink the size of the remote control device 10.

The sensor 20 is in the sleeping mode in the regular conditions. When the sensor 20 receives the wake-up signal 111 from the remote control device 10, it enters the setting mode. In the setting mode it receives the first command signal 121 from the remote control device 10. The first command signal 121 is transformed to a second command signal 201 to be sent to the system host 30.

After the system host 30 has received the second command signal 201 from the sensor 20, it executes alteration of the security supervisory control system procedure. After the alteration has been finished a confirmation signal 301 is sent back to the sensor 20. The sensor 20 has a display device 21 which may be a light emitting diode or a buzzer (that is an embodiment example, and not the limitation of the invention). When the sensor 20 has received the confirmation signal 301 from the system host 30, the display device 21 is activated to inform users that alteration setting is finished, and the individual setting of the sensor 20 also is completed. The setting may include clustering a plurality of sensors 20, or ON/OFF of alarm function of the sensor 20.

Figure 2:
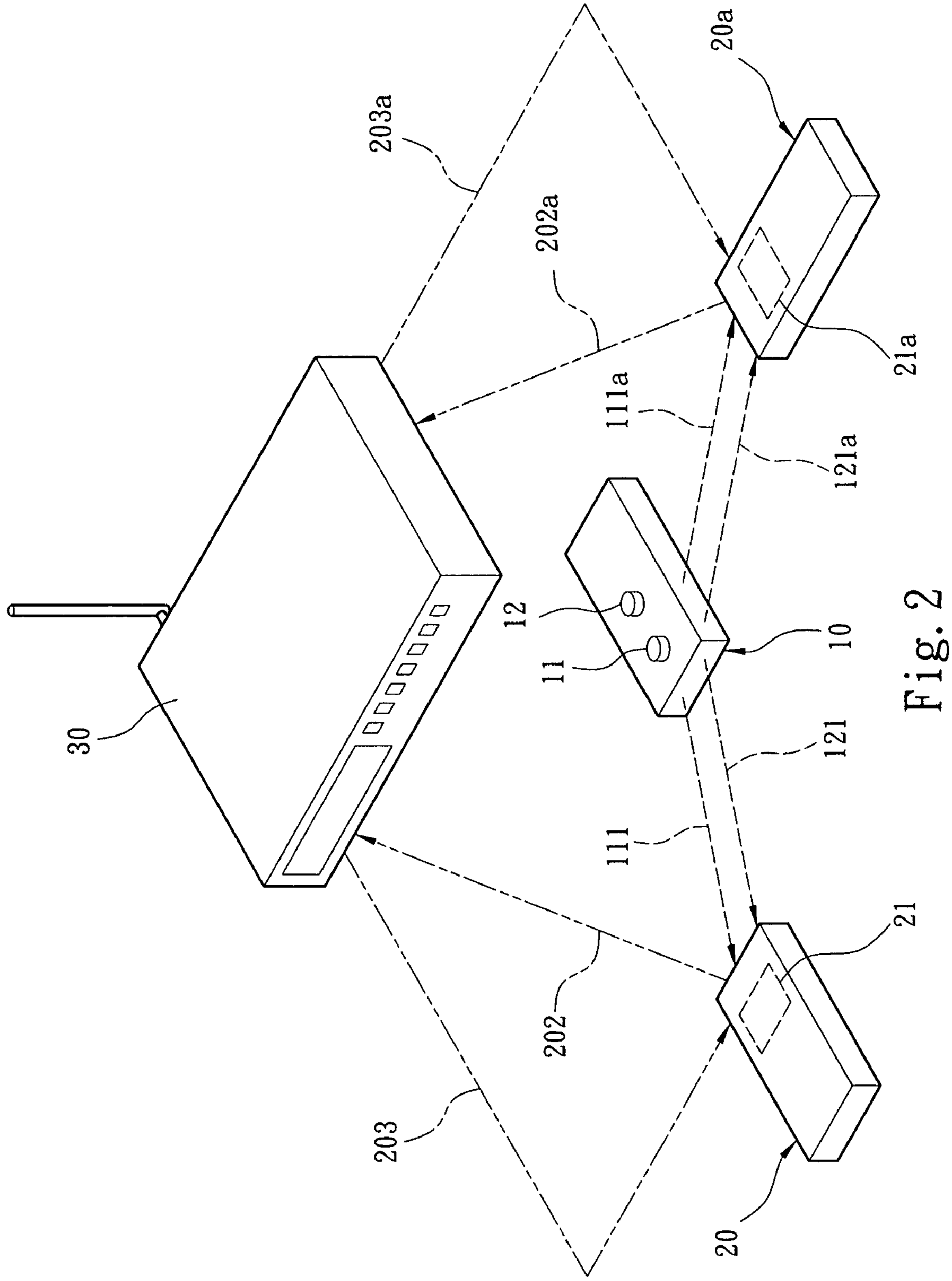
FIG. 2 is a schematic view of signal transmission to determine a sensor to receive a first command signal.

In order to prevent the sensor 20 from erroneously entering the setting mode by a signal of a lower power caused by the remote control device 10 due to their being too close to each another, the invention provides two measures to determine which sensor 20 to receive the first command signal 121 from the remote control device 10 thereby to alter the security supervisory control system procedure. Refer to FIG. 2 for an example that includes two neighboring sensors 20. The sensors 20 and 20*a* receive wake-up signals 111 and 111*a* simultaneously from the remote control device 10. The sensors 20 and 20*a*, depending on the power intensity of the wake-up signals 111 and 111*a*, transform respectively to a first determination signal 202 and 202*a* to be sent to the system host 30. The system host 30 receives the first determination signals 202 and 202*a*, and interprets the power intensity of the two wake-up signals 111 and 111*a*, then determines which of the sensors 20 and 20*a* to receive the first command signals 121 and 121*a*. Finally, according to second determination signals 203 and 203*a* sent to the sensors 20 and 20*a*, whether the sensors 20 and 20*a* to receive the follow on signals from the remote control device 10 is determined. If it is judged that one sensor 20 is closer to the remote control device 10, that sensor 20 receives the first command signal 121; while the other sensor 20*a* that is being judged farther away from remoter control device 10 does not receive the other first command signal 121*a*.

Figure 3:
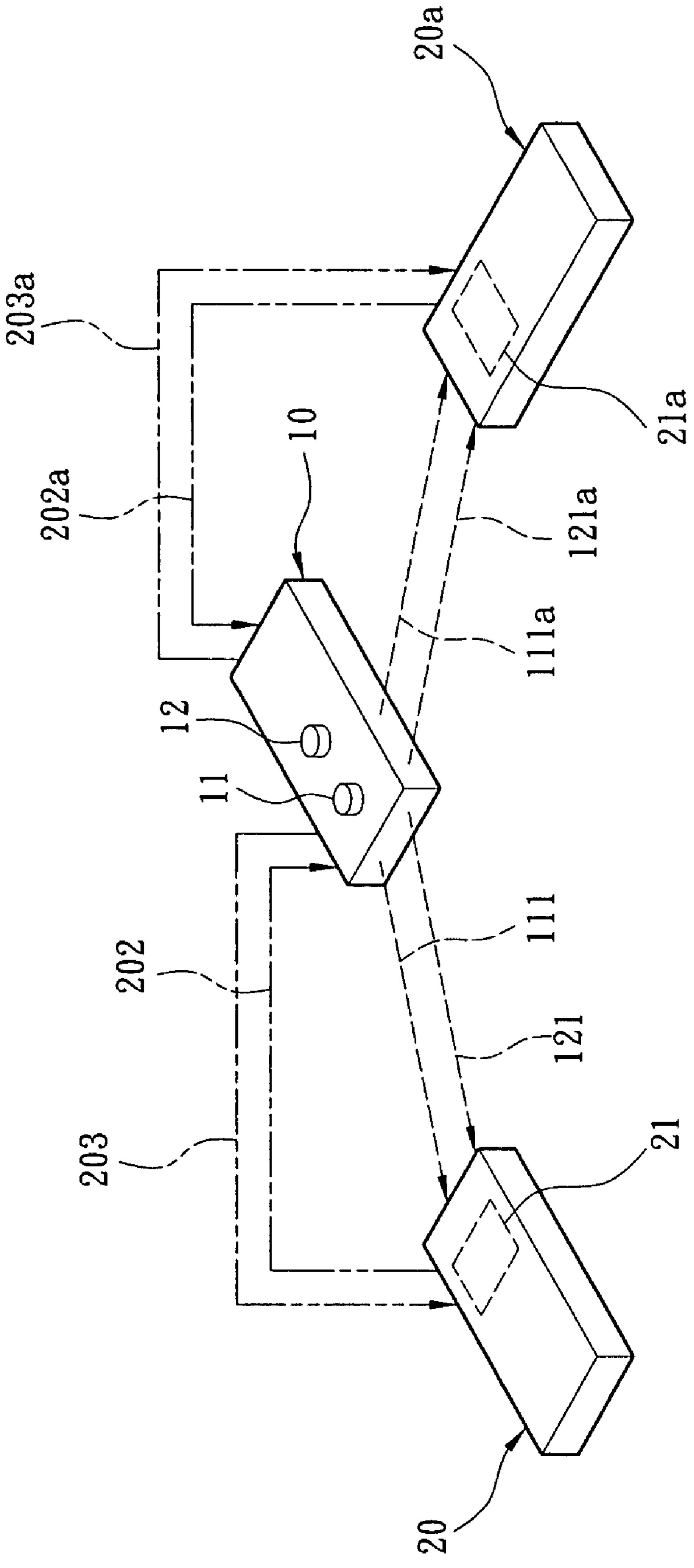
FIG. 3 is another schematic view of signal transmission to determine a sensor to receive the first command signal.

Refer to FIG. 3 for another measure to determine which sensor 20 to receive the first command signal 121 from the remote control device 10. It also includes two sensors 20 and 20*a* as an example. The two sensors 20 and 20*a* receive the wake-up signals 111 and 111*a* simultaneously from the remote control device 10. The sensors 20 and 20*a*, depending on the power intensity of the wake-up signals 111 and 111*a*, transform respectively to a first determination signal 202 and 202*a* to be sent to the remote control device 10. The remote control device 10 receives the first determination signals 202 and 202*a*, and interprets the power intensity of the two wake-up signals 111 and 111*a*, then determines which of the sensors 20 and 20*a* to receive the first command signals 121 and 121*a*. Finally, according to the second determination signals 203 and 203*a* sent to the sensors 20 and 20*a*, whether the sensors 20 and 20*a* to receive the follow on signals from the remote control device 10 is determined.

The remote control security supervisory control apparatus of the invention controls the sensor 20 through the remote control device 10 at a remote site. It simplifies the alteration procedure of the conventional security supervisory control system that has to be performed on the system host 30. The remote control device 10 can directly set ON/OFF of alarm function of the individual sensor 20 or set clusters of sensors 20. Thus time and effort for setting the sensor 20 can be reduced. The setting procedure of the sensor 20 is simpler. And users can perform setting immediately according to requirements.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A remote control security supervisory control apparatus, comprising:

a remote control device which has a start key to switch the remote control device between a sleeping mode in regular conditions and a designated mode to execute system alteration, and outputs a wake-up signal in the designated mode and outputs a first command signal while the system alteration is proceeding;

a sensor which is in the sleeping mode in the regular conditions and enters a setting mode after having received the wake-up signal from the remote control device, and receives the first command signal in the setting mode and transforms the first command signal to a second command signal; and a system host to receive the second command signal from the sensor to execute alteration of a security supervisory control system procedure and feedback a confirmation signal to the sensor;

wherein the remote control device reduces the power of the wake-up signal output thereof in the designated mode.

2. The remote control security supervisory control apparatus of claim 1, wherein the remote control device has a designated function key to output the first command signal.

3. The remote control security supervisory control apparatus of claim 2, wherein the designated function key is a compound key.

4. The remote control security supervisory control apparatus of claim 1, wherein the system alteration is setting ON/OFF of an alert function of the sensor.

5. The remote control security supervisory control apparatus of claim 1, wherein the system alteration is setting clusters of a plurality of sensors.

6. The remote control security supervisory control apparatus of claim 1, wherein the sensor has a display device which activated after the sensor has received the feedback confirmation signal.

7. The remote control security supervisory control apparatus of claim 6, wherein the display device is a light emitting diode.

8. The remote control security supervisory control apparatus of claim 6, wherein the display device is a buzzer.

9. The remote control security supervisory control apparatus of claim 1, wherein signal transmission among the remote control device, the sensor and the system host is performed through radio frequency.

10. The remote control security supervisory control apparatus of claim 1, wherein the sensor transforms the wake-up signal to a first determination signal to be sent to the system host, the system host making interpretation and sending a second determination signal to the sensor to determine whether to receive the command signal from the remote control device.

11. The remote control security supervisory control apparatus of claim 1, wherein the sensor transforms the wake-up signal to a first determination signal to be sent to the remote control device, the remote control device making interpretation and sending a second determination signal to the sensor to determine whether to receive the command signal from the remote control device.

* * * * *